UNITED STATES PATENT OFFICE.

RUDOLF BESSEL, OF PAULAU, NEAR BRIEG, GERMANY.

INSECTICIDE FUEL.

SPECIFICATION forming part of Letters Patent No. 421,809, dated February 18, 1890.

Application filed June 27, 1889. Serial No. 315,837. (No specimens.)

*To all whom it may concern:*

Be it known that I, RUDOLF BESSEL, teacher, of Paulau, near Brieg, in the Kingdom of Prussia and German Empire, have invented a new means for destroying mice, rats, rabbits, hamsters, moles, foxes, &c., of which the following is a specification.

This invention relates to a new means for destroying mice, rats, rabbits, hamsters, moles, foxes, &c., which when ignited discharges poisonous gases, killing in a few minutes the vermin found in a building or hole. This means consists of the combination of the following materials: (*a*,) pulverized coal, three hundred and eighty parts, by weight; (*b*,) pulverized sulphur, two hundred and thirty parts, by weight; (*c*,) pulverized saltpeter, one hundred and fifty-two parts, by weight; (*d*,) pulverized pine resin, one hundred and fifty-two parts, by weight; (*e*,) pulverized phosphorus, ten parts, by weight; (*f*,) alcohol, seventy-six parts, by weight; together one thousand parts, by weight.

When the various ingredients are mixed, the coal, sulphur, saltpeter, and pine resin are finely pulverized and kneaded to the consistence of paste with a solution of phosphorus and spirit, then formed into balls and thoroughly dried. The size of the ball varies according to that of the animal or vermin which has to be exterminated.

For mice, moles, and such small animals suitable balls are made with a diameter of one centimeter; for rats, marmots, foxes, &c., balls of two centimeters diameter will be found advantageous.

The dried balls have the property of becoming easily lighted.

This exterminating means is used in the following manner: The balls are laid or held in a suitable holder, such as a spoon of tinned sheet-iron, which is provided with a hole formed in the center of the hollow part thereof. Then the holder carrying the said ball is placed over a burning lamp, which, for protection against wind and weather, is placed in a lantern, the ball being held for an instant over the flame, so that it takes light in a moment and burns over the whole of its surface; or the material may be lighted in any other suitable way. The lighted ball is then allowed to slide or roll down in the hole or domicile of the animal, where it continues to burn freely and discharges heavy, intense, and poisonous gases, which kill in a moment all the animals found in the hole or place of abode; or it may be applied in any other convenient manner.

Having now particularly described and ascertained the nature of my said invention and in what manner the same is to be performed, I declare that what I claim is—

A vermin-killer consisting of powdered coal, sulphur, saltpeter, pine resin, phosphorus, and alcohol, in substantially the proportions specified, kneaded into a paste and dried.

In witness whereof I have hereunto set my hand in presence of two witnesses.

RUDOLF BESSEL.

Witnesses:
K. TOWOIDRICH,
CARL ERBEY.